United States Patent [19]

Gladish

[11] Patent Number: 5,090,330
[45] Date of Patent: Feb. 25, 1992

[54] RUNNER FOR AIR CONVEYOR SYSTEM

[76] Inventor: Herbert E. Gladish, Sailrail Enterprises, P.O. Box 3521, Station C, Ottawa, Ontario, K1Y 4L5, Canada

[21] Appl. No.: 634,077

[22] Filed: Dec. 26, 1990

[51] Int. Cl.$^5$ .................................... B60V 3/04
[52] U.S. Cl. .................. 104/23.2; 267/151; 267/141; 406/88
[58] Field of Search .............. 198/811; 104/23.1, 23.2, 104/134, 290, 292; 193/2 R; 267/153, 151, 141, 141.1; 406/88, 86, 92, 77; 180/164, 117–119; 280/610; 5/431, 434–442

[56] References Cited

U.S. PATENT DOCUMENTS

| | | | |
|---|---|---|---|
| 924,893 | 6/1909 | Doddridge | 5/434 X |
| 2,392,557 | 1/1943 | Smith et al. | 414/598 |
| 2,941,681 | 6/1960 | Reyes | 414/594 |
| 3,448,870 | 6/1966 | Gallo et al. | 414/273 |
| 3,873,163 | 3/1975 | Gladish | 302/2 R |
| 4,489,825 | 12/1984 | Gladish | 198/811 |
| 4,550,806 | 11/1985 | Bocker | 187/10 |
| 4,550,807 | 11/1985 | Ohlgren | 187/10 |
| 4,550,823 | 11/1985 | Gladish | 198/805 |
| 4,579,320 | 4/1986 | Gladish | 267/140.1 |
| 4,616,960 | 10/1986 | Gladish | 406/88 |
| 4,687,079 | 8/1987 | Gladish | 188/268 |
| 4,838,169 | 6/1989 | Gladish | 104/23.2 |
| 4,887,706 | 12/1989 | Gladish | 198/774 |

Primary Examiner—Joseph E. Valenza
Assistant Examiner—Cheryl L. Gastineau
Attorney, Agent, or Firm—Jones, Tullar & Cooper

[57] ABSTRACT

An improved runner for use with a SAILRAIL hydrostatic bearing levitation system is disclosed. The runner uses a substantially solid core having a degree of flexibility in a vertical plane, a thin pad of flexible, compliant material extending transversely around the core, and an outer flexible, compliant sheath enclosing the pad and the core. Flexibility is enhanced by a longitudinally extending slot cut into the core from the upper surface thereof. The side walls of the core are flat and straight and meet the lower convex surface of the core at a generally sharp longitudinal edge. Also the ends of the runner can angle upwardly to enhance the ability of the runner to traverse joints, gaps, or imperfections in the SAILRAIL rail. The runner can be secured to a deck member and provides specific advantages over prior art runners which had a larger profile, were more expensive and were not as efficient as the low profile runner of this invention.

17 Claims, 4 Drawing Sheets

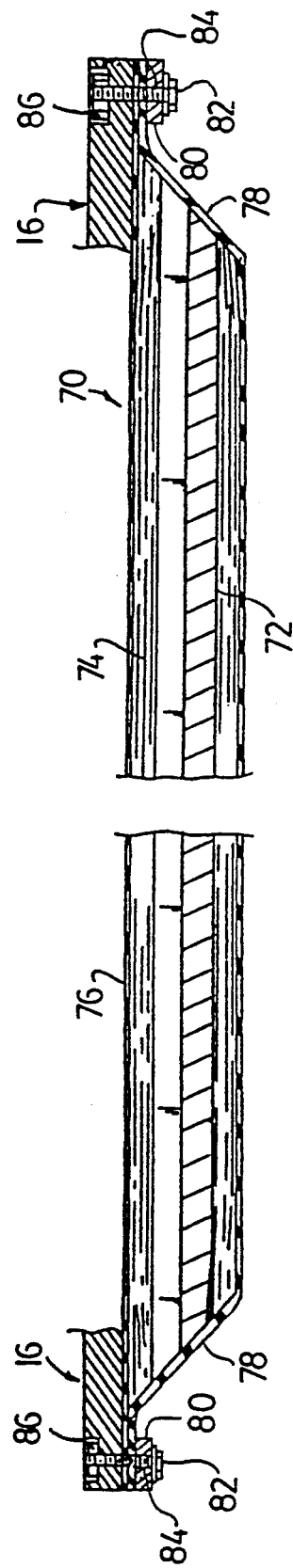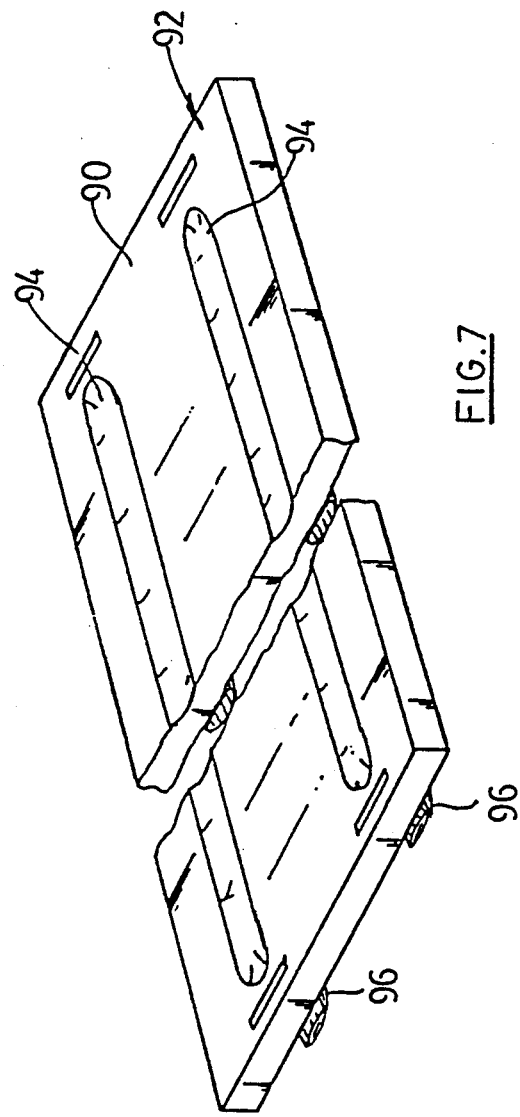

5,090,330

RUNNER FOR AIR CONVEYOR SYSTEM

TECHNICAL FIELD

The present invention relates in general to improved load supporting members, or runners, that might be utilized in hydrostatic bearing levitation systems; that is, in systems using fluid pressure to support and guide heavy loads as they move along a track system.

BACKGROUND ART

While the principle of utilizing air pressure to support and guide a load as it moves along a track is not new, improvements have been realized in load-carrying efficiency through the implementation of a system using rail sections having a concave support surface through which small diameter nozzles extend, the nozzles being angled with respect to both longitudinal and transverse planes. Air exiting the nozzles under pressure, provided in a plenum below the rail, creates a thin film between the rail surface and load support member positioned in the rail. The thin film of pressurized air creates a hydrostatic bearing on which the load support member can ride so that the member and the load supported thereby can move easily as it is guided along the rail. Usually a pair of rails will be positioned side by side to define a track system, there being a load supporting member located in each rail of the track system so as to support a carrier or deck which spans the gauge distance between the rails and is adapted to carry the desired load. A palletized load can be placed on the deck for movement along the track system.

Load carrying systems of the aforementioned type are sold commercially under the trade-mark "SAIL-RAIL" by Sailrail Enterprises, a division of E. B. Eddy Forest Products Ltd. Various patents relate to the system per se, the design of the rails, and the design of the runners, including U.S. Pat. Nos. 3,873,163; 4,489,825; 4,550,823; 4,579,320; 4,616,960; 4,687,079 and 4,887,706.

The two major components of the SAILRAIL system are the rail, or track, and the load support member, or runner. The runner must meet several criteria in order to be effective. It must be compliant so as to aid in the proper distribution of the air film and thus work on rails that have profiles that are slightly variable or imperfect due to wear, dirt or manufacturing tolerances; it must be abrasive resistant and tough so that replacement is not required very often; it must be reasonably light since runners with decks attached may be lifted by hand to or from the rails; it must be easily attached to or removed from a deck; it must work efficiently in the rail system for which it is designed; and it must be economical to manufacture and maintain.

Heretofore runners for SAILRAIL systems have been manufactured in lengths of about four feet using a "log", being a roll of cellulosic paper product wound tightly on a collapsible cardboard core. The paper product was quite strong in tensile and had some stretch capability as a result of limited crepe. The web product resembled commercial serviette or napkin stock and is produced on the same production machinery that makes paper bathroom and towelling rolls. For the SAILRAIL product, however, the wound circular log was first of all compressed while positioned on a curved plate of rail dimensions under a load of about 8000 pounds to create a generally oval shape in transverse cross section in which the upper surface is flatter than the curved lower surface. The deformed log was then wrapped in a cover which was smooth, tough, compliant, abrasion resistant and moisture-proof. The cover could be, for example, a high density polyethylene with additives such as $T_iO_2$ to improve wear properties. The cover was closed over the log to secure the log, to provide the reactive bearing surface, and the resulting runner was ready for attachment to and subsequent use with a deck. The lower curvature was very close to that of the rail surface; the upper surface was generally flat for attachment to the underside of the deck; and the combination of the collapsed core, the squashed cellulosic material and the cover provided a runner that was compliant, capable of limited deformation under the application of a load and capable of at least partial recovery after load removal.

Runners manufactured as above are very effective and do exhibit vibration cushioning properties, but they are expensive to manufacture and because of their bulk are somewhat limited in their applicability to situations in which less exposure would be desirable. There is thus a need for a more versatile and less expensive runner to make the SAILRAIL system more attractive to potential users of the system.

An improvement on the above-described runners is taught in U.S. Pat. No. 4,838,169 which describes a runner having an elongated core, the core having a generally flat upper surface and a generally transversely convex lower surface. A pad of flexible, compliant material covers at least the lower surface and an outer cover generally encloses the pad and core. The pad and core are formed of material that is capable of deformation under load and at least partial recovery when the load is removed. The runner of U.S. Pat. No. 4,838,169 uses less pad material than previous runners but, even with transverse slots cut in the upper surface thereof it does not exhibit sufficient flexibility for use with all rails under all conditions.

SUMMARY OF THE INVENTION

The present invention meets the requirements mentioned above by providing a runner which also uses a greatly reduced volume of cellulosic material therein without compromising the effectiveness or efficiency of the runner in a SAILRAIL system. As with the runner of U.S. Pat. No. 4,838,169 the runner of the present invention replaces the cardboard core and wound web with a substantially solid core member preformed to a desired shape. A pad of flexible compliant material covers substantially the entire surface of the core member. A compliant outside sheath or tube covers the core member and pad. The runner of the present invention improves on the runner of U.S. Pat. No. 4,838,169 by having at least one longitudinally extending slot or kerf in the core, the slot or kerf descending into the core from the upper surface thereof. Furthermore, the side edges of the core are flat and straight, defining a sharp lower edge at the junction between each side wall and the convex bottom surface. At each end the lower surface of the runner can be angled upwardly to facilitate crossing of joints or gaps during travel along a rail. Lastly, the cover is in the form of a transversely continuous tube or sheath into which a core wound with compliant material is inserted. The ends of the tube or sheath can be brought together and sealed so as to hermetically seal the interior of the runner.

In one embodiment the core member is formed from softwood and the pad is made up of a plurality of layers of cellulosic material. In other embodiments the core member could be extruded as hollow (or solid) lengths of plastic material, wood pulp material, rubber or metal (such as aluminum) and/or the pad could be made from a suitable compressible material such as wood or fibreglass. The core member could also be segmented longitudinally and/or transversely (straight across or diagonally) for added flexibility, and this would be especially desirable if the rail system, as for example in a warehouse, has horizontal and/or vertical curves. The runner of the present invention surpasses the previous runner insofar as performance is concerned; it is economical to produce; it has a low profile and is more easily protected; and furthermore, by using a preformed core member it is possible to ensure that each runner produced is more closely identical to other runners produced in the same manner than was previously possible and this will mean that the runner provides improved and more consistent profile footprints.

BRIEF DESCRIPTION OF THE DRAWINGS

FIGS. 3 to 8 show schematic representations of additional features and embodiments of the present invention.

DESCRIPTION OF THE PREFERRED EMBODIMENT

Figure 1:
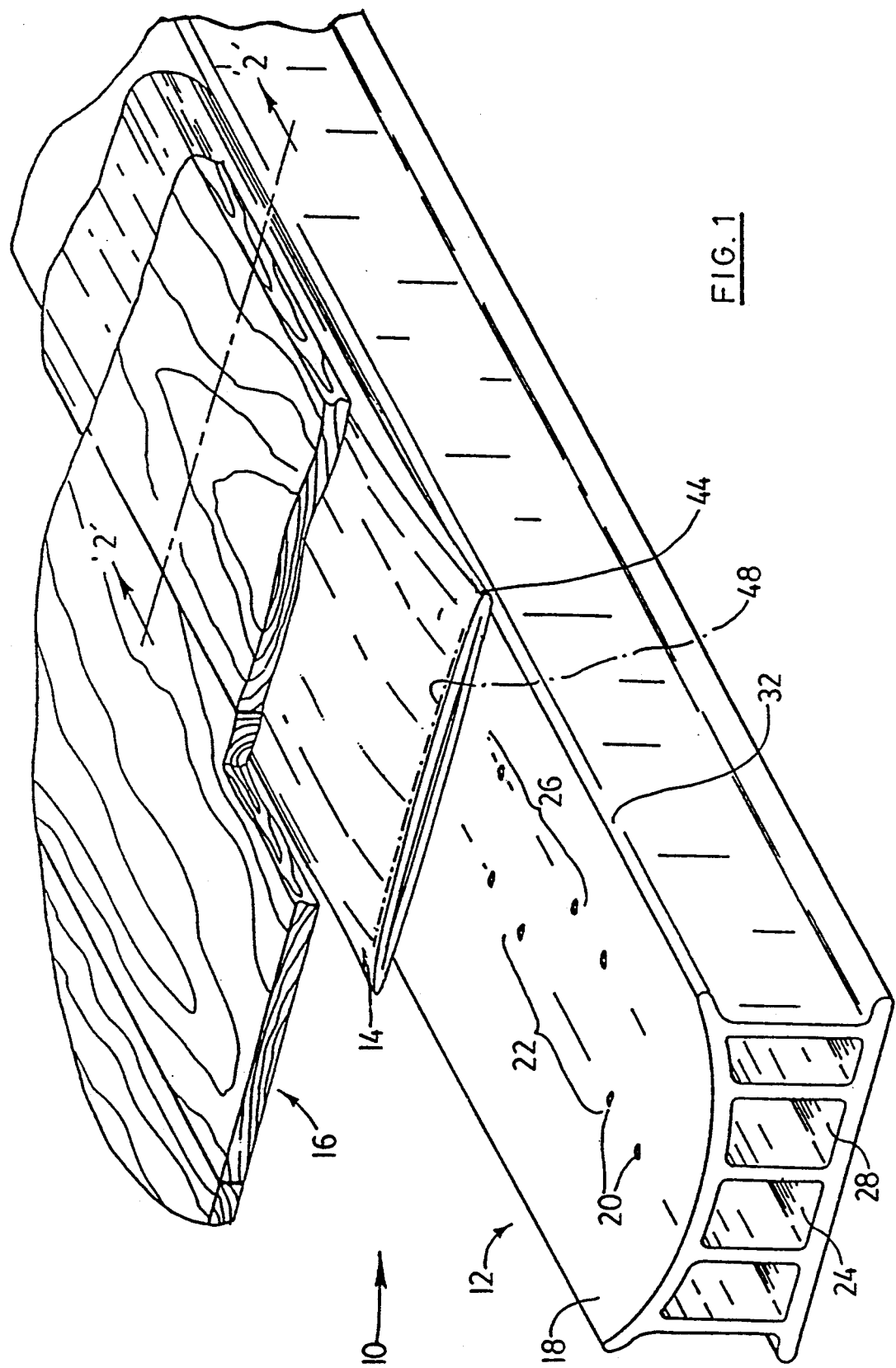
FIG. 1 shows, in perspective, a portion of a SAILRAIL system including a rail and a runner in accordance with the present invention.

FIG. 1 illustrates a typical SAILRAIL arrangement 10 comprising a rail 12, a runner 14 and a deck 16. The rail 12 has a transversely shallowly concave upper surface 18 through which nozzles 20 extend. The nozzles are arranged in staggered aligned groups with one set 22 of groups communicating with an internal port, or plenum 24, and the other set 26 communicating with another internal port, or plenum 28. Each individual nozzle 20 is angled relative to the longitudinal axis of the rail and with respect to a tangent at the rail surface. Preferably the nozzles of set 22 are angled toward the edge 30 while the nozzles of set 26 are angled toward the edge 32. The design of the rail 12 is covered in U.S. Pat. No. 4,616,960 and need not be discussed further herein.

The deck 16 can be made from plywood, plastic, steel, or fabricated from other suitable materials. It must, of course, be sufficiently strong to support the intended load without any significant deformation or vibration when loaded and moving, and to allow for sufficient runner attachment anchoring.

Figure 2:
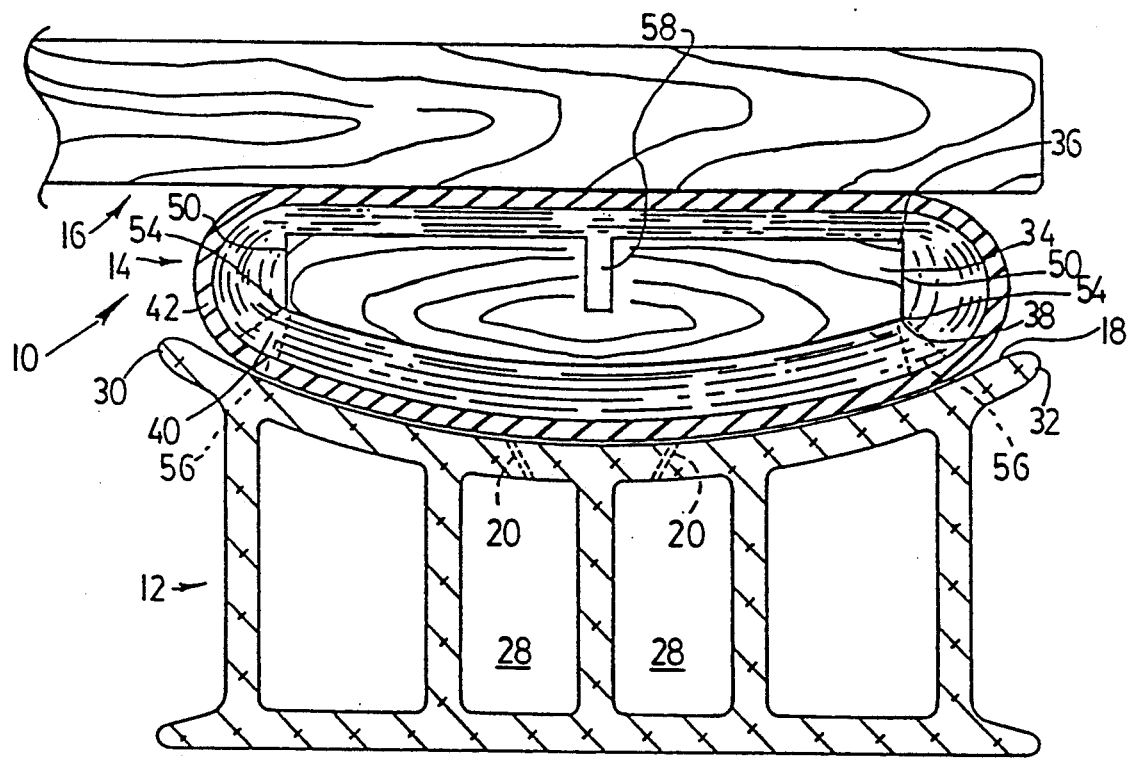
FIG. 2 shows a transverse cross-section along the line 2—2 of FIG. 1.
Figure 3:
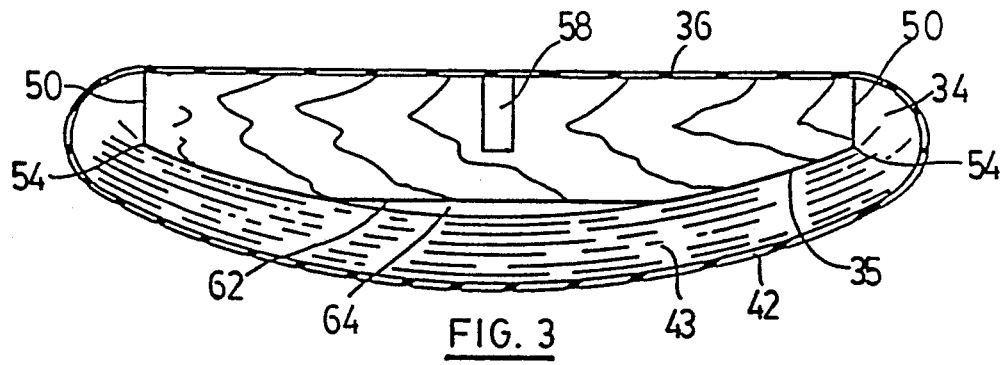
Figure 4:
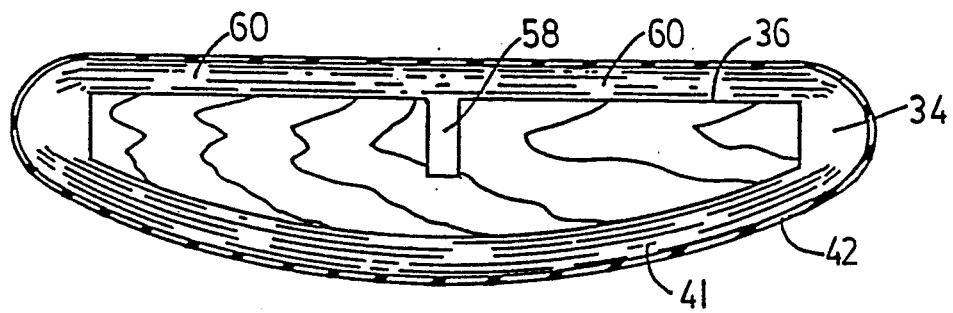

The runner 14 of this invention is shown in FIGS. 1 and 2 in position in the track or rail 12 and carrying the deck 16. As best seen in FIG. 2 the runner 14 includes a substantially solid core member 34 which, in the illustrated embodiment, is shaped from wood so as to have a generally flat top surface 36 and a transversely convex lower surface 38, the latter having a slightly reduced degree of curvature so as to allow compensate for the additional thickness of compliant pad material for compatability with the upper surface 18 of the rail 12. Preferably the core member 34 will exhibit a certain degree of vertical flexibility over its length, typically about four feet. Adjacent the lower surface 38 and wrapped around the remainder of the core member 34 is a pad 40 of flexible compliant material, the material covering the core to a thickness of about ⅛ inch in the manufactured runner. Preferably the pad 40 is made up of layers of cellulosic material such as might be cut from the outer plies of a large diameter roll of cellulosic material. In fact, the roll from which the pad 40 might be cut could be the same type of roll which might have been used in its entirety to make one of the prior art runners. It is possible that the core could be wrapped with a continuous web of cellulose, or in fact separate upper and lower pads, or even just a single lower pad, could be utilized as illustrated in FIGS. 3 and 4 discussed hereinbelow.

A cover 42 in the form of a continuous sheath or tube encloses the pad 40 and the wooden core member 34 longitudinally, with the pad being under compression. The cover 42 may be made from relatively thick (0.4 inch) high density polyethylene, a material that is strong, smooth, stiff, abrasion and wear resistant and yet is appropriately flexible and compliant for the runner of this invention. The extruded sleeve-like cover 42 is sized so that when it is squashed to generally the shape of the wound core it can be slid over the wound core to completely enclose the wound core from end to end thereof. A portion of the sheath material will extend beyond the ends of the wound core.

At each end of the runner 14 the extensions 44 of the cover can be squeezed together and sealed, ultrasonically or by any suitable adhesive, along the line 48 so as to hermetically seal the interior of the runner.

As shown in FIG. 2 the core 34 has straight flat edges 50 generally normal to the upper surface 36 and meeting the convex lower surface at a sharp edge 54. When pad material is wound on the core hardened corner areas 56 are formed at the sharp corners, which help to seal the air at the longitudinal edges between the runner and the rail during operation of the SAILRAIL system.

Also, as seen in FIG. 2, the core is provided with a longitudinally extending slot or kerf 58 which is cut or otherwise provided in the body of the core, descending from the upper surface 36. This slot 58 enhances the flexibility of the core in a vertical transverse plane and improves the ability of the runner to conform to the rail surface and to override any irregularities in the rail surface. The slot 58 is relatively narrow and should not be deeper than half the core thickness. More than one slot 58 can be provided (see FIG. 8) but there is little or no enhanced performance therewith.

As illustrated, the core 34 is formed from a length of wood, preferably a softwood. Such material is easy to work with, will have a certain degree of flexibility in the vertical plane and it is easy to cut a slot 58 therein. As an alternative to wood the core 34 could be extruded from plastics or metals, could be hollow or solid or could be moulded in foam or other thermal or chemical setting materials.

The pad 40 is preferably made from layers of cellulosic materials as described hereinabove but it could be formed from any suitable material which is compressible under load and which recovers substantially under load removal. Suitable alternative materials for the pad include foam rubber, foam plastic, steel curlings, wool, steel wool or fibreglass, for example.

FIGS. 3 to 7 illustrate, somewhat schematically, additional features which represent improvements and/or alternative constructions with respect to the prior art runners.

In FIG. 3 a single pad 43 is shown only on the bottom surface of the core 34. This embodiment is operable but does not have the benefits of the embodiments of FIGS.

1, 2 or 4. FIG. 3 also shows a feature wherein a portion 62 of the arcuate lower core surface 38 is planed flat so as to create a slight gap 64 between the portion 62 and the pad 43 therebelow. This gap or cavity 64 provides a space into which the pad 43 can expand to enhance the air film cavity by varying the footprint pressure of the pad as it vibrates, along with sheath 42, under the influence of the jets exiting from the nozzles 20 in the rail 12. A certain degree of sheath and pad vibration (or "dither") is desirable to help reduce the coefficient of friction between the cover and the rail surface at start-up and to also aid in propagation of the fluid film under the runner as the runner travels along the rail.

FIG. 4 is a view similar to FIG. 2 but showing separate pads 41 and 60 on the upper and lower surfaces 36,38 respectively of the core 4. The material 60 could be of the same or different material as the pad 41. The pad 60 should extend the full width of surface 36 and possibly will extend around the edges 54. By providing additional padding, albeit a thin layer of padding, suspension vibration control will be improved and a smoother, more uniform ride for the load will result. More importantly, the flexibility of the core 34 will not be restrained.

The surface portion 62 need not be a flat surface. It could also take the form of a slight concavity formed upwardly into the lower surface 38 of the core. Furthermore, the cavity 64 need not be centered transversely of the runner 14. It could be offset toward one side of the runner or the other, especially when used with bias loading sometimes experienced with monorail application.

Figure 5A:
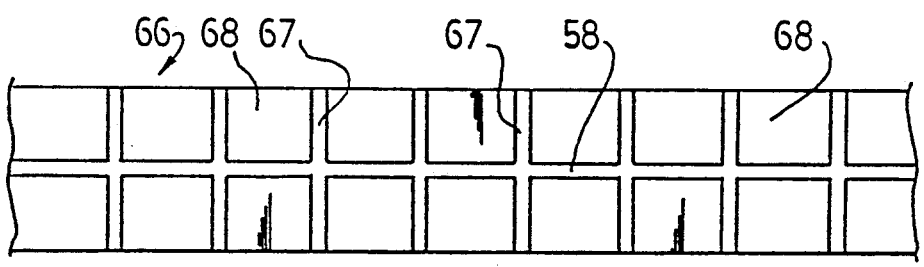

FIG. 5A shows a plan view of a core member 66 having a plurality of individual, in addition to the longitudinal slot 58, longitudinally spaced apart transverse slits or cuts 67 in the upper portion thereof, defining core sections 68. By providing a series of core sections 68 the runner 66 will have an even greater ability to flex in pitch and yaw than the runner 14 and this can be a benefit if the rail system in which the runner 66 is to operate has changes in elevation and/or direction therein. Indeed, individual separate core members each having a longitudinal slot therein could be longitudinally spaced apart within a single runner for even more flexibility.

Figure 5B:
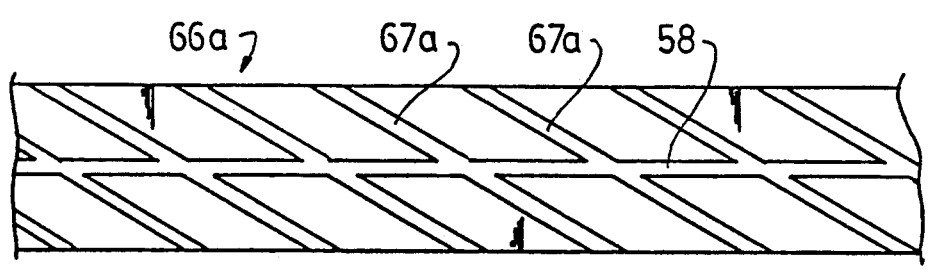

FIG. 5B shows a plan view of a core member 66a having a plurality of diagonal slits or cuts 67a in addition to the longitudinal slot 58. Diagonal slits 67a help the core member to flex more gradually in the longitudinal direction.

FIG. 6 shows a longitudinal section through a runner 70 having a slotted core 72 wound with pad material 74 and encased in a sheath 76. In this case the runner has an upwardly angled portion 78 at each end. The sheath material conforms generally to this angled portion and the effect thereof makes it easier to bring the upper and lower portions of the sheath together for an hermetic seal as at 80. The upward angle on the runner will also enhance the ability of the runner to traverse joints, gaps or imperfections in the rail. The addition of a wiper strip (not shown) to reduce the chance of foreign material ingress may be added at any time but is not necessarily part of this invention.

FIG. 6 also shows the preferred manner of connecting the deck 16 to a runner. The gap between the upper and lower portions of the sheath is sealed and a hard steel clamping bar 80 is positioned under the lower portion of the sheath. The bar 80 extends beyond the edges of the sheath and bolts 82 pass through holes 84 in such extensions for reception in recessed nuts 86 in the deck. With this technique there is no penetration of the sheath and the runner remains hermetically sealed.

FIG. 7 shows a deck assembly wherein the stacking of assemblies is enhanced by providing the upper surface 90 of a deck 92 with longitudinal depressions 94 that generally conform to the surface of a rail. When deck assemblies are stacked the weight borne by any pair of runners from the assemblies stacked thereon is distributed over a much larger area than if the runners rested on a flat surface. Runner life is greatly extended as runners made to conform to a rail surface at all times help to maintain the efficiency of the bearing system. Of course, the lowermost assembly of a stack would have to be separately supported so that the weight of a stack of assemblies is not concentrated on the lowermost runners.

Figure 8:
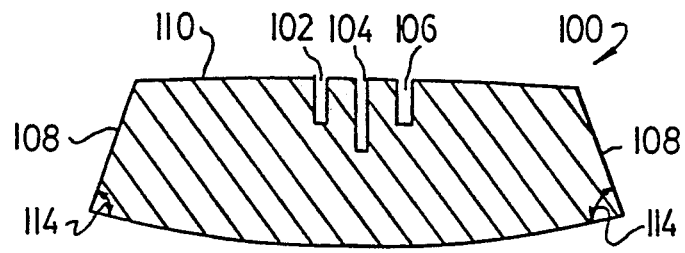

FIG. 8 shows a transverse section of a core member 100 having three longitudinal slots or kerfs 102,104,106, the centre one (104) being slightly deeper than the other two. The core member also has its flat, straight sides 108 angled downwardly and outwardly from the upper surface 110, meeting the lower surface 112 at a sharp edge 114. This would have the effect of improving flexibility along the seal areas of the runner.

Another feature portrayed in FIG. 8 is a slightly convex upper surface 110. Since the deck 16 is not physically attached to the core member there will be a slight degree of transverse rocking movement available which can enhance free movement of a runner along the rail.

Any or all of the features shown in FIG. 8 could be used with any of the embodiments already described.

The present invention provides an improved runner for SAILRAIL systems, achieving the advantages enumerated hereinbefore. Preferred embodiments of the invention have been disclosed but it is expected that a skilled practitioner could effect changes therein without departing from the spirit of the invention. The scope of protection to be afforded this invention is to be determined from the claims appended hereto.

I claim:

1. A load supporting means for positioning between a load and a concave load supporting surface for supporting said load above said surface, said means including an elongated core member having an upper surface and a generally transversely convex lower surface, pad means of flexible compliant material covering at least said lower surface, and an outer cover generally enclosing said pad means and said core, said pad means and said cover being formed of material which is capable of deformation under load and at least partial recovery when the load is removed, characterized by slot means extending into said core member longitudinally thereof from said upper surface, and flat, straight side walls, each extending downwardly from said upper surface along a respective side of said core member to meet said lower surface at a generally sharp, longitudinal lower edge.

2. The load supporting means of claim 1 characterized in that said cover is a transversely continuous sheath, hermetically sealed at each end thereof to completely enclose said core member and said pad.

3. The load supporting means of claim 2 characterized in that adjacent each end of said load supporting means the end wall thereof angles downwardly and inwardly.

4. The load supporting means of claim 3 characterized in that said sheath extends beyond each end wall of said load supporting means, upper and lower portions of the sheath extensions adjoining each other and being sealed together.

5. The load supporting means of claim 2 characterized in that said core member from a substantially solid material selected from the group comprising: hardwoods, softwoods, plastics materials, foam, rubber and extruded aluminum.

6. The load supporting means of claim 2 characterized in that said core member is formed as a hollow extrusion from a suitable plastic or metallic material.

7. The load supporting means of claim 2 characterized in that said pad means is formed from a material selected from the group comprising: closely packed layers of cellulosic material, steel curlings, wool, fibreglass and foam rubber.

8. The load supporting means of claim 2 characterized by a central profiled surface portion in said lower surface defining a cavity between said lower surface and the adjacent upper surface of said pad means.

9. The load supporting means of claim 2 characterized by a plurality of transverse slots in said core member, said transverse slots being essentially coextensive in depth with said slot means.

10. The load supporting means of claim 2 characterized by a plurality of diagonal slots in said core member, said transverse slots being essentially coextensive in depth with said slot means.

11. The load supporting means of claim 2 characterized in that said side walls are generally normal to said upper surface.

12. The load supporting means of claim 2 characterized in that said side walls angle downwardly and outwardly from said upper surface.

13. The load supporting means of claim 2 characterized in that said upper surface is slightly transversely convex.

14. The load supporting means of claim 2 characterized by a plurality of parallel longitudinal slot means extending into said core member.

15. The load supporting means of claim 2 in combination with a load supporting deck member characterized in that said deck member includes longitudinal extending transversely concave depression means conforming generally to the shape of said concave load supporting surface.

16. A deck and runner assembly for positioning between a load and a concave load supporting surface for supporting said load above said surface, said assembly including a generally rectangular deck member attached to a pair of parallel runners located thereunder, each runner including an elongated core having an upper surface and a generally transversely convex lower surface, pad means of flexible compliant material wound transversely about said core and an outer cover enclosing said pad means and said core, said pad means and said cover being formed of material which is capable of deformation under load and at least partial recovery when the load is removed, characterized in that: a generally rectangular slot extends into said core along the length thereof from said upper surface; said core has flat, straight side walls, each extending downwardly from said upper surface to meet said lower surface at a generally sharp, longitudinal lower edge; and the upper surface of said deck member has a pair of generally transversely concave depressions therein each conforming generally to the shape of said concave load support surface, for receiving the runner of another deck and runner assembly stacked thereon.

17. The assembly of claim 16 characterized in that said cover member extends beyond the ends of the runner and is hermetically sealed, said deck member being connected to said runner at each end thereof by an elongated bar member which clamps the cover extension, and hence the runner, to the deck member.

* * * * *